United States Patent
Ito et al.

(10) Patent No.: US 8,319,709 B2
(45) Date of Patent: Nov. 27, 2012

(54) DISPLAY DEVICE AND MANUFACTURING METHOD THEREOF

(75) Inventors: Hiroshi Ito, Chiba (JP); Kazunori Ojima, Mobara (JP); Hideaki Abe, Chiba (JP); Shinji Tanabe, Mobara (JP); Masayuki Yanagihara, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 405 days.

(21) Appl. No.: 12/622,457

(22) Filed: Nov. 20, 2009

(65) Prior Publication Data
US 2010/0134439 A1 Jun. 3, 2010

(30) Foreign Application Priority Data
Nov. 21, 2008 (JP) .................................. 2008-297655

(51) Int. Cl.
*G09G 3/30* (2006.01)

(52) U.S. Cl. ............. 345/76; 345/36; 345/75.2; 345/82; 345/173; 345/174

(58) Field of Classification Search .......................... None
See application file for complete search history.

(56) References Cited

U.S. PATENT DOCUMENTS

| | | | |
|---|---|---|---|
| 6,351,254 B2 * | 2/2002 | Dinh et al. ................... | 345/75.2 |
| 6,664,950 B1 * | 12/2003 | Blanchard ..................... | 345/173 |
| 6,879,319 B2 * | 4/2005 | Cok .............................. | 345/173 |
| 7,161,588 B2 * | 1/2007 | Nakanishi et al. ............. | 345/173 |
| 7,515,125 B2 * | 4/2009 | Yamazaki et al. .............. | 345/76 |
| 7,542,105 B2 * | 6/2009 | Sato et al. ...................... | 349/58 |
| 2005/0046622 A1 * | 3/2005 | Nakanishi et al. ............. | 345/173 |
| 2005/0099402 A1 * | 5/2005 | Nakanishi et al. ............. | 345/173 |
| 2008/0165139 A1 * | 7/2008 | Hotelling et al. .............. | 345/173 |
| 2009/0050855 A1 * | 2/2009 | Majumdar et al. ............. | 252/500 |
| 2009/0061721 A1 * | 3/2009 | Isa .................................. | 445/24 |
| 2009/0267505 A1 * | 10/2009 | Lee et al. ........................ | 313/509 |
| 2009/0322705 A1 * | 12/2009 | Halsey, IV .................... | 345/174 |

FOREIGN PATENT DOCUMENTS

JP 2008-158251 7/2008

* cited by examiner

*Primary Examiner* — Dismery Mercedes
(74) *Attorney, Agent, or Firm* — Antonelli, Terry, Stout & Kraus, LLP.

(57) ABSTRACT

A display device of the invention includes a display panel attached to one face side of a light transmissive circuit board and a light transmissive substrate attached to the other face side of the circuit board. A mounted component is mounted on the other face side of the circuit board. The circuit board includes a light transmissive junction layer for joining the circuit board to the light transmissive substrate at a position avoiding the mounted component. The junction layer includes a core substrate formed of a resin, an adhesive layer formed on one face of the core substrate, and a bonding layer formed on the other face of the core substrate and cured. The adhesive layer is adhered to the circuit board, and the bonding layer is firmly fixed to the light transmissive substrate.

15 Claims, 1 Drawing Sheet

DISPLAY DEVICE AND MANUFACTURING METHOD THEREOF

CROSS-REFERENCE TO RELATED APPLICATION

The present application claims priority from Japanese application JP 2008-297655 filed on Nov. 21, 2008, the content of which is hereby incorporated by reference into this application.

BACKGROUND OF THE INVENTION

1. Field of the Invention

The present invention relates to a display device and a manufacturing method thereof.

2. Description of Related Art

Display panels, such as liquid crystal display panels or organic electroluminescence panels, having a circuit board such as a touch panel attached thereto have been known. A light transmissive substrate is attached to the circuit board. In this case, the circuit board and the light transmissive substrate are both rigid bodies. It is difficult to remove air bubbles when a pressure-sensitive adhesive double coated sheet is used for attaching them together, and therefore an adhesive is used for attachment. Since a mounted component such as a flexible wiring board or an integrated circuit chip is mounted on the circuit board, it is sometimes required to provide a gap between the circuit board and the light transmissive substrate. JP-A-2008-158251 is an example of related art.

SUMMARY OF THE INVENTION

As an adhesive used in the related art described above, a UV curing adhesive that is cured by irradiation with light for bonding is used, for example. Such a UV curing adhesive is formed to a thickness of about from 30 to 70 µm, that is, it cannot be formed very thick in view of the properties of the material.

On the other hand, printing is sometimes applied to the rear face (side where the display panel is disposed) of the light transmissive substrate at a portion corresponding to the periphery of a display region of the display panel in order to ensure design or to block light coming from other than the display region of the display panel. When a sufficient gap is not formed between the circuit board and the light transmissive substrate like the related art described above, it has been found that there arises a problem of interference between a print layer formed on the light transmissive substrate and the circuit board. In addition, there is also another problem that the adhesive is not suitable for repair because it firmly bonds.

It is an object of the invention to provide a display device that prevents interference between a light transmissive substrate and a circuit board by providing a sufficient gap between the circuit board and the light transmissive substrate and enables uniform attachment of the light transmissive substrate to the circuit board.

It is another object of the invention to provide a display device that is easily repaired.

(1) A display device according to the invention includes: a display panel; a light transmissive circuit board attached to a display face of the display panel; a light transmissive substrate disposed on the opposite side of the circuit board from the display panel so as to face the circuit board; a mounted component mounted on the circuit board such that at least a part of the mounted component is intervened between the circuit board and the light transmissive substrate; and a light transmissive junction layer joining the circuit board to the light transmissive substrate at a position avoiding the mounted component, wherein the junction layer includes a core substrate formed of a resin, an adhesive layer formed on one face of the core substrate, and a bonding layer formed on the other face of the core substrate and cured, the adhesive layer is adhered to one of the circuit board and the light transmissive substrate, and the bonding layer is firmly fixed to the other of the circuit board and the light transmissive substrate. According to the invention, a sufficient gap can be provided between the circuit board and the light transmissive substrate because the core substrate is intervened therebetween, and repair of the light transmissive substrate can be easily performed because the adhesion interface can be separated.

(2) The display device according to (1) may further include a print layer formed on a face of the light transmissive substrate, the face facing the circuit board, wherein the print layer may form a convex portion protruding from the surface of the light transmissive substrate, and the core substrate may have a concave portion on a face facing the light transmissive substrate where the region facing the print layer is reduced in height.

(3) A method for manufacturing a display device according to the invention includes the steps of: preparing a display panel, a light transmissive circuit board having a mounted component mounted thereon, a light transmissive substrate, and a core substrate formed of a light transmissive resin; attaching the circuit board to a display face of the display panel; adhering the core substrate to one of the circuit board and the light transmissive substrate via an adhesive layer; and bonding the other of the circuit board and the light transmissive substrate to the core substrate adhered to the one of the circuit board and the light transmissive substrate with an adhesive, wherein the step of bonding with the adhesive is performed such that at least a part of the mounted component is intervened between the circuit board and the light transmissive substrate. According to the invention, it is possible to provide a sufficient gap between the circuit board and the light transmissive substrate, prevent interference in a difference of level of the circuit board, and uniformly attach the circuit board to the light transmissive substrate because the core substrate is intervened. In addition, since the adhesion interface can be separated, the light transmissive substrate can be easily repaired.

(4) Another display device according to the invention includes: a display panel such as, for example, a liquid crystal display panel or an organic EL display panel; a capacitive touch panel disposed on a display face side of the display panel; and a first transparent substrate such as, for example, a glass substrate or an acrylic substrate disposed on the opposite side of the capacitive touch panel from the display panel so as to face the capacitive touch panel, wherein a second transparent substrate such as, for example, a PET film is disposed between the capacitive touch panel and the first transparent substrate, the capacitive touch panel and the second transparent substrate are adhered to each other with a pressure-sensitive adhesive, and the first transparent substrate and the second transparent substrate are bonded to each other with, for example, a UV curing adhesive. In the display device described above, the capacitive touch panel and the second transparent substrate are adhered to each other with a pressure-sensitive adhesive. Therefore, even if attachment is not successfully performed due to the occurrence of misalignment, the intrusion of air bubbles, or the like when they are attached to each other, they can be easily separated from each other with normal human force. Therefore, a display device excellent in repair can be provided.

In the display device with the structure, when a flexible printed board is connected to the capacitive touch panel, and a print layer is formed on a face of the first transparent substrate on the side where the display panel is disposed at a portion facing the flexible printed board, the thickness can be increased with the second transparent substrate. Therefore, the contact of the print layer with the flexible printed board can be avoided. In the case of this configuration, the total thickness of the pressure-sensitive adhesive, the second transparent substrate, and the adhesive corresponding to the display region is greater than the total thickness of the print layer and the flexible printed board. In the invention, bonding and adhering are different from each other in that viscosity is higher in bonding than in adhering. In short while adhering means the case where things attached to each other can be separated from each other with normal human force, bonding means the case where they cannot be separated with normal human force.

DESCRIPTION OF THE PREFERRED EMBODIMENT

The object of the invention is to provide a display device in which a sufficient gap is provided between a circuit board and a light transmissive substrate and that can be repaired. The display device of the invention includes a display panel attached to one face (first face of the circuit board) side of the light transmissive circuit board and the light transmissive substrate attached to the other face (second face of the circuit board) side of the circuit board. The circuit board has a mounted component mounted on the other face (second face of the circuit board) side. The circuit board includes a light transmissive junction layer for joining the circuit board to the light transmissive substrate at a position avoiding the mounted component. The junction layer includes a core substrate formed of a resin, an adhesive layer formed on one face (first face of the core substrate) of the core substrate, and a bonding layer formed on the other face (second face of the core substrate) of the core substrate and cured. The adhesive layer is adhered to the circuit board, and the bonding layer is firmly fixed to the light transmissive substrate.

Hereinafter, an embodiment of the invention will be described with reference to the drawings.

Figure 1:
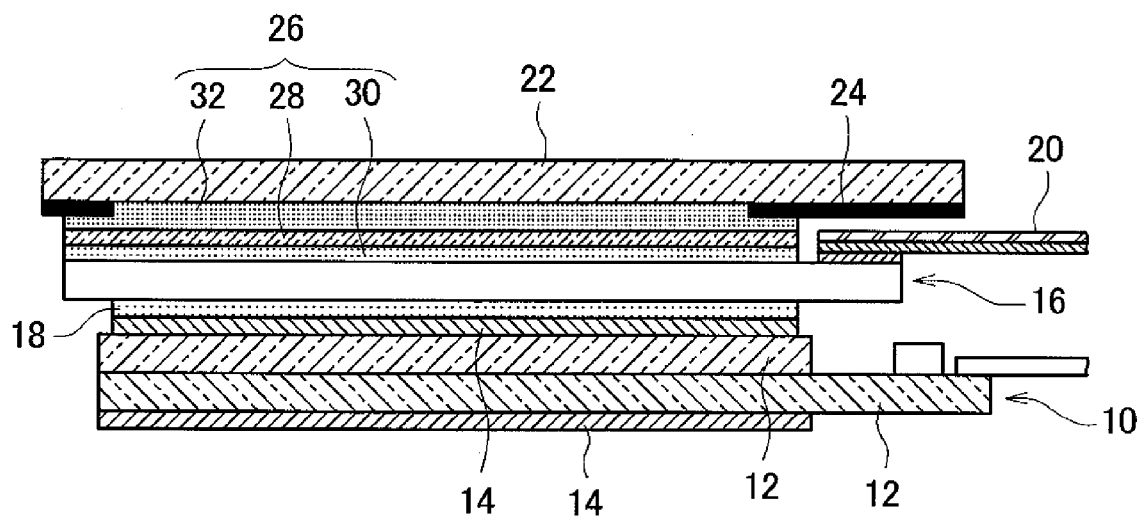
FIG. 1 is a cross-sectional view showing a display device according to an embodiment of the invention.

FIG. 1 is a cross-sectional view showing a display device according to the embodiment of the invention. The display device includes a display panel 10.

The display panel 10 shown in FIG. 1 is a liquid crystal display panel, including a pair of substrates 12 (for example, glass substrates or plastic substrates), liquid crystal (not shown) interposed between the pair of substrates 12, and a pair of polarizers 14 attached to the respective faces of the pair of substrates 12, the faces facing opposite each other. A liquid crystal driving driver or a flexible wiring board is mounted on one of the substrates 12. As a modification, the display panel 10 may be an organic electroluminescence panel.

A light transmissive circuit board 16 is attached to a display face of the display panel 10 (for example, to a surface of the polarizer 14 of the display face side). Although FIG. 1 only schematically shows the circuit board 16, the circuit board 16, which is assumed as a touch panel, includes a not-shown rigid substrate (glass substrate) and a circuit or wiring formed thereon. The touch panel of the embodiment is not a so-called resistive touch panel but a capacitive touch panel that detects a touch position by detecting a change in capacitance. The display panel 10 and the circuit board 16 are bonded to each other with an adhesive 18 (for example, UV curing adhesive). A display device formed by attaching a touch panel to the display panel 10 can be also referred to as a touch screen.

A mounted component 20 is mounted on the circuit board 16. Although the mounted component 20 shown in FIG. 1 is a flexible wiring board, it may be a semiconductor chip as a driving driver. The mounted component 20 is electrically connected to the wiring of the circuit board 16. The mounted component 20 is disposed such that at least a part of the mounted component 20 is intervened between the circuit board 16 and a light transmissive substrate 22. In the embodiment, the circuit board 16 and the mounted component 20 are connected to each other with an anisotropically conductive film. The total thickness of the mounted component 20 and the anisotropically conductive film used for mounting is about 70 to 100 μm.

The light transmissive substrate 22 is disposed on the opposite side of the circuit board 16 from the display panel 10 so as to face the circuit board 16. For example, the light transmissive substrate 22 is disposed for protecting the circuit board and may be glass (for example, hardened glass) or a resin substrate formed of an acrylic resin. In either case, the light transmissive substrate 22 is a rigid substrate. Even when the light transmissive substrate 22 is rigid, input can be performed without a hitch as long as the circuit board 16 as a touch panel is of capacitive type. Since the light transmissive substrate 22 is larger than the circuit board 16, the entire projection plane of the circuit board 16 lies inside the outline of the light transmissive substrate 22, and a part of the light transmissive substrate 22 protrudes from the circuit board 16.

A print layer 24 is formed on a face of the light transmissive substrate 22, the face facing the circuit board 16. The print layer 24 is formed to a thickness of, for example, 10 μm, forming a convex portion that protrudes from the surface of the light transmissive substrate 22. The light transmissive substrate 22 is disposed such that at least a part of the print layer 24 faces the circuit board 16.

At least a part of the mounted component 20 is intervened between the circuit board 16 and the light transmissive substrate 22. However, a gap is formed between the mounted component 20 and the light transmissive substrate 22 (or the print layer 24).

The circuit board 16 and the light transmissive substrate 22 are joined together by a light transmissive junction layer 26. The junction layer 26 is present at a position avoiding the mounted component 20. A part of the junction layer 26 overlaps at least a part of the print layer 24. The thickness of the junction layer 26 is about from 70 μm to 300 μm.

The junction layer 26 includes a core substrate 28 formed of a resin. For example, the core substrate 28 is a transparent film or transparent substrate formed of PET (polyethylene terephthalate). The thickness of the core substrate 28 is about from 40 to 250 μm. Even a substrate that is lower in rigidity than the circuit board 16 or the light transmissive substrate 22 and is bendable can be used for the core substrate 28.

An adhesive layer 30 is adhered to one face of the core substrate 28. The adhesive layer 30 is adhered to one of the circuit board 16 and the light transmissive substrate 22 (the circuit board 16 in FIG. 1). Air bubbles do not enter the adhesion interface of the adhesive layer 30, which improves visibility. That is, light is not refracted or scattered by air bubbles. The adhesion interface of the adhesive layer 30 can be separated. As the adhesive layer, a structure that has a thickness of, for example, about 20 µm and is previously formed integrally with a transparent substrate (transparent film) formed of PET or the like can be considered.

A cured bonding layer 32 is bonded to the other face of the core substrate 28. The bonding layer 32 is formed by curing a liquid or paste adhesive. An example of the bonding layer includes a UV curing adhesive. The thickness of the bonding layer 32 is about from 30 to 70 µm. The bonding layer 32 is firmly fixed to the other of the circuit board 16 and the light transmissive substrate 22 (the light transmissive substrate 22 in FIG. 1). Air bubbles do not enter the bonding interface of the bonding layer 32, which improves visibility. That is, light is not refracted or scattered by air bubbles. Since the bonding interface of the bonding layer 32 is firmly coupled, separation is difficult.

According to the embodiment, since the core substrate 28 is intervened, a sufficient gap can be provided between the circuit board 16 and the light transmissive substrate 22, and the mounted component 20 can be disposed therebetween. Further, since the adhesion interface due to the adhesive layer 30 can be separated, the light transmissive substrate 22 can be easily repaired. On the other hand, since the bonding interface of the bonding layer 32 is firmly coupled, joint strength can be ensured. The display device according to the embodiment can be applied to a mobile phone, PDA, liquid crystal display module for digital camera, and liquid crystal module for multimedia player. When the reflection of external light is suppressed by controlling the refractive index of the material of the junction layer 26 (including the adhesive layer 30, the core substrate 28, and the bonding layer 32), visibility is further improved.

Next, a method for manufacturing the display device according to the embodiment will be described. In the method for manufacturing the display device, the display panel 10, the light transmissive circuit board 16 having the mounted component 20 mounted thereon, the light transmissive substrate 22, and the core substrate 28 formed of a light transmissive resin are prepared.

The circuit board 16 is attached to the display face of the display panel 10. Attachment is performed by disposing the adhesive 18 in the form of liquid or paste and curing the same. As the adhesive 18, a UV curing adhesive may be used.

The core substrate 28 is adhered to one of the circuit board 16 and the light transmissive substrate 22 (for example, the circuit board 16) via the adhesive layer 30. The adhesive layer 30 may be previously adhered to the core substrate 28 and then adhered to the circuit board 16. Since the adhesive layer 30 itself can be bent, the adhesive layer is brought into a bent state and adhered to the core substrate 28 while removing air bubbles from the adhesion interface. When the other face of the adhesive layer 30 adhered to the core substrate 28 is adhered to the circuit board 16, since the core substrate 28 can also be bent, the core substrate 28 and the adhesive layer 30 are brought into the bent state and adhered to the circuit board 16 while removing air bubbles from the adhesion interface.

The other of the circuit board 16 and the light transmissive substrate 22 (for example, the light transmissive substrate 22) is bonded to the core substrate 28 adhered to one of the circuit board 16 and the light transmissive substrate 22 (for example, the circuit board 16) with an adhesive (for example, UV curing adhesive) as a precursor of the bonding layer 32. Since the circuit board 16 and the light transmissive substrate 22 are both rigid, air bubbles cannot be removed when a pressure-sensitive adhesive is used. Therefore, an adhesive is used.

In this case, the step of bonding with the adhesive is performed such that at least a part of the mounted component 20 is intervened between the circuit board 16 and the light transmissive substrate 22.

The method for manufacturing the display device according to the embodiment includes a process that is self-evident from the configuration of the display device described above and further includes a well-known process as a method for manufacturing a display device.

Figure 2:
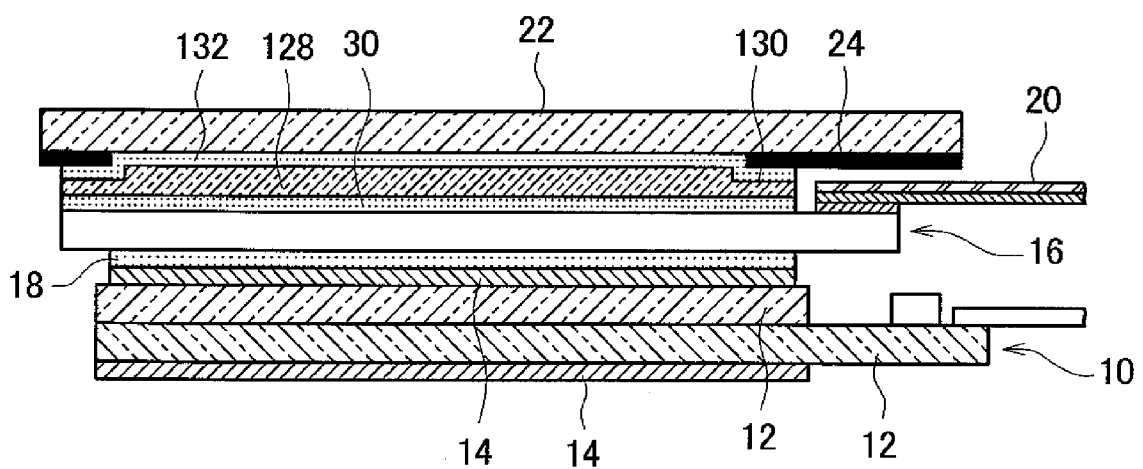
FIG. 2 is a cross-sectional view showing a modification of the display device according to the embodiment of the invention.

FIG. 2 is a cross-sectional view showing a modification of the display device according to the embodiment of the invention.

In the above embodiment, a difference in height is formed between the surface of the light transmissive substrate 22 and the surface of the print layer 24. A part of the bonding layer 32 is reduced in thickness corresponding to the difference in height. Specifically, the portion of the bonding layer 32 that faces the print layer 24 is reduced in thickness.

In the modification, a core substrate 128 has a concave portion 130 where the region facing the print layer 24 is reduced in height on a face facing the light transmissive substrate 22. The concave portion 130 is formed at ends of the core substrate 128. A difference in height is formed between the bottom face of the concave portion 130 and the surface of the core substrate 128 adjacent to the concave portion. According to the modification, it is possible to reduce or eliminate non-uniformity in thickness of a bonding layer 132 by forming the concave portions 130 in the core substrate 128. The details described in the above embodiment apply to the other details of the modification.

The invention is not limited to the above embodiment but can be modified in various ways. For example, the configuration described in the embodiment can be replaced with substantially the same configuration, a configuration providing the same operation and effect, or a configuration capable of achieving the same object.

What is claimed is:

1. A display device comprising:
    a display panel;
    a light transmissive circuit board attached to a display face of the display panel;
    a light transmissive substrate disposed on the opposite side of the circuit board from the display panel so as to face the circuit board;
    a mounted component mounted on the circuit board such that at least a part of the mounted component is intervened between the circuit board and the light transmissive substrate; and
    a light transmissive junction layer joining the circuit board to the light transmissive substrate at a position overlapping a display area of the display panel and avoiding the mounted component, wherein
    the junction layer includes a core substrate formed of a resin, an adhesive layer formed on one face of the core substrate, and a bonding layer formed on the other face of the core substrate and cured,
    the adhesive layer is adhered to one of the circuit board and the light transmissive substrate, and the bonding layer is firmly fixed to the other of the circuit board and the light transmissive substrate.

2. The display device according to claim 1, further comprising a print layer formed on a face of the light transmissive substrate, the face facing the circuit board, wherein
    the print layer forms a convex portion protruding from the surface of the light transmissive substrate, and the core substrate has a concave portion on a face facing the light transmissive substrate where the region facing the print layer is reduced in height.

3. A method for manufacturing a display device comprising the steps of:
(a) preparing a display panel, a light transmissive circuit board having a mounted component mounted thereon, a light transmissive substrate, and a core substrate formed of a light transmissive resin;
(b) attaching the circuit board to a display face of the display panel;
(c) adhering the core substrate to one of the circuit board and the light transmissive substrate via an adhesive layer at a position overlapping a display area of the display panel; and
(d) bonding the other of the circuit board and the light transmissive substrate to the core substrate adhered to said one of the circuit board and the light transmissive substrate with an adhesive, wherein
the step of bonding with the adhesive is performed such that at least a part of the mounted component is intervened between the circuit board and the light transmissive substrate.

4. The method according to claim 3, wherein the light transmissive circuit board comprises a capacitive touch panel.

5. A display device comprising:
a display panel;
a capacitive touch panel disposed on a display face side of the display panel; and
a first transparent substrate disposed on the opposite side of the capacitive touch panel from the display panel so as to face the capacitive touch panel, wherein
a second transparent substrate is disposed between the capacitive touch panel and the first transparent substrate,
the second transparent substrate covers a part of the display area of the display panel,
the capacitive touch panel and the second transparent substrate are adhered to each other with a pressure-sensitive adhesive, and
the first transparent substrate and the second transparent substrate are bonded to each other with an adhesive,
said display device further comprising:
a light transmissive substrate disposed on an opposite side of the capacitive touch panel from the display face side of the display panel, and
a light transmissive junction layer joining the touch panel to the light transmissive substrate at a position overlapping the display area of the display panel.

6. The display device according to claim 5,
wherein the adhesive is a UV curing adhesive.

7. The display device according to claim 6,
wherein the second transparent substrate has a lower rigidity than the first transparent substrate.

8. The display device according to claim 5,
wherein a print layer is formed on a face of the first transparent substrate on the side where the display panel is disposed at a portion corresponding to a peripheral portion of a display region of the display panel.

9. The display device according to claim 8,
wherein the adhesive is formed such that at least a part of the adhesive covers the print layer.

10. The display device according to claim 5,
wherein a flexible printed board is connected to the capacitive touch panel, and
a print layer is formed on a face of the first transparent substrate on the side where the display panel is disposed at a portion facing the flexible printed board.

11. The display device according to claim 10,
wherein the total thickness of the pressure-sensitive adhesive, the second transparent substrate, and the adhesive corresponding to the display region is greater than the total thickness of the print layer and the flexible printed board.

12. The display device according to claim 1, wherein the light transmissive circuit board comprises a capacitive touch panel.

13. The display device according to claim 5, further comprising a mounted component mounted on the capacitive touch panel at a position such that the light transmissive junction layer does not overlap the mounted component, and at a position that the mounted component intervenes between the touch panel and the light transmissive substrate.

14. The display device according to claim 13, wherein the light transmissive junction layer includes a core substrate formed of a resin, an adhesive layer formed on one face of the core substrate and a bonding layer formed on the other face of the core substrate.

15. The display device according to claim 5, wherein the light transmissive junction layer includes a core substrate formed of a resin, an adhesive layer formed on one face of the core substrate and a bonding layer formed on the other face of the core substrate.

* * * * *